(12) United States Patent
Kurth et al.

(10) Patent No.: US 10,199,742 B2
(45) Date of Patent: Feb. 5, 2019

(54) PASSIVE FREQUENCY MULTIPLEXER

(71) Applicant: RAYTHEON COMPANY, Waltham, MA (US)

(72) Inventors: Antony J Kurth, Allen, TX (US); Ethan Hettwer, Richardson, TX (US); Joel C. Roper, Plano, TX (US)

(73) Assignee: Raytheon Company, Waltham, MA (US)

( * ) Notice: Subject to any disclaimer, the term of this patent is extended or adjusted under 35 U.S.C. 154(b) by 240 days.

(21) Appl. No.: 15/133,060

(22) Filed: Apr. 19, 2016

(65) Prior Publication Data

US 2017/0302394 A1    Oct. 19, 2017

(51) Int. Cl.

| | | |
|---|---|---|
| *H04J 4/00* | (2006.01) | |
| *H04B 7/06* | (2006.01) | |
| *H04L 5/00* | (2006.01) | |
| *H01Q 21/00* | (2006.01) | |
| *H01Q 25/00* | (2006.01) | |
| *H01Q 19/06* | (2006.01) | |
| *H01Q 3/22* | (2006.01) | |

(52) U.S. Cl.
CPC .......... *H01Q 21/0037* (2013.01); *H01Q 3/22* (2013.01); *H01Q 19/06* (2013.01); *H01Q 25/008* (2013.01); *H04B 7/0617* (2013.01); *H04L 5/0005* (2013.01)

(58) Field of Classification Search
CPC ............ H01Q 3/22; H01Q 3/40; H01Q 19/06; H01Q 21/0037; H01Q 25/008; H04B 7/0617; H04B 7/0697; H04J 4/005; H04L 5/0005; H04W 28/18; H04W 72/0453
See application file for complete search history.

(56) References Cited

U.S. PATENT DOCUMENTS

| | | | | |
|---|---|---|---|---|
| 4,121,221 A | * | 10/1978 | Meadows | H01Q 3/26 342/370 |
| 4,408,205 A | * | 10/1983 | Hockham | G01S 7/2813 342/157 |
| 4,677,440 A | | 6/1987 | Edson et al. | |
| 4,721,966 A | | 1/1988 | McGrath | |
| 5,115,248 A | * | 5/1992 | Roederer | H01Q 3/2658 342/368 |

(Continued)

FOREIGN PATENT DOCUMENTS

EP    2 608 317 A1    6/2013

OTHER PUBLICATIONS

International Search Report from related International Application No. PCT/US2017/017720, International Search Report dated Apr. 11, 2017 and dated May 9, 2017 (4 pgs.).

(Continued)

*Primary Examiner* — Alpus Hsu
(74) *Attorney, Agent, or Firm* — Lewis Roca Rothgerber Christie LLP

(57) ABSTRACT

A passive frequency multiplexer includes a beam forming network lens including a plurality of input terminals and a plurality of output terminals; a transmission line for transmitting a signal to the beam forming lens; and a plurality of couplers arranged in series along the transmission line, each of the plurality of couplers comprising an input terminal, an output terminal, and a coupled output terminal, each of the coupled output terminals of the plurality of couplers being coupled to a respective one of the input terminals of the beam forming network lens.

14 Claims, 4 Drawing Sheets

(56) References Cited

U.S. PATENT DOCUMENTS

| | | | | |
|---|---|---|---|---|
| 5,576,721 | A * | 11/1996 | Hwang | H01Q 25/007 343/753 |
| 5,936,588 | A * | 8/1999 | Rao | H01Q 3/24 342/372 |
| 6,304,225 | B1 * | 10/2001 | Hemmi | H01Q 1/288 343/753 |
| 6,348,890 | B1 * | 2/2002 | Stephens | H01Q 3/2676 342/375 |
| 6,680,698 | B2 * | 1/2004 | Eiges | H01Q 1/28 342/361 |
| 7,084,811 | B1 * | 8/2006 | Yap | H01Q 3/2676 342/373 |
| 9,041,603 | B2 * | 5/2015 | Roper | H01Q 25/008 342/373 |
| 9,543,662 | B2 * | 1/2017 | Marr | H01Q 25/008 |
| 9,620,865 | B2 * | 4/2017 | Nagaishi | H01Q 21/0031 |
| 9,628,164 | B1 | 4/2017 | Thompson et al. | |
| 9,748,648 | B2 * | 8/2017 | Caille | H01Q 3/40 |
| 2014/0029599 | A1 * | 1/2014 | Kinamon | H04B 7/0857 370/338 |
| 2016/0301466 | A1 * | 10/2016 | Kinamon | H04B 7/2628 |

OTHER PUBLICATIONS

Written Opinion of the International Searching Authority from related International Application No. PCT/US2017/017720, dated May 9, 2017 (7 pgs.).

P.S. Henry, et al., "A Low-Loss Diffraction Grating Frequency Multiplexer", IEEE Transactions on Microwave Theory and Techniques, vol. MTT-26, No. 6, Jun. 1978, (pp. 428-433).

F.S. Johansson, "Frequency-Scanned Gratings Consisting of Photo-Etched Arrays", IEEE Transactions on Antennas and Propagation, vol. 37, No. 8, Aug. 1989 (pp. 996-1002).

Christen Rauscher, "A Compact Ridge-Waveguide Contiguous-Channel Frequency Multiplexer", IEEE Transactions on Microwave Theory and Techniques, vol. 57, No. 3, Mar. 2009, (pp. 647-656).

* cited by examiner

US 10,199,742 B2

PASSIVE FREQUENCY MULTIPLEXER

BACKGROUND

1. Field

Example embodiments of the present invention relate to a passive frequency multiplexer for passive RF signal processing.

2. Description of the Related Art

Frequency domain information is typically acquired from time domain signals via sampling, high-speed digitization, and digital signal processing. This process consumes a large amount of power and requires a high volume of processors.

SUMMARY

Embodiments of the present invention are capable of converting time domain signals to frequency domain signals in real time using passive RF components. Embodiments of the present invention include a beam forming network lens connected to RF couplers located in series along a transmission line. According to embodiments of the present invention, an input signal is provided on the transmission line, and each RF coupler couples a portion of the input signal to a respective input on the beam forming network lens. Using planar wave construction and deconstruction, the beam forming network lens forms sums and nulls at the beam taps (outputs) of the beam forming network lens to split the input signal into frequency groups that can be directly sampled at the beam taps.

Embodiments of the present invention include a passive frequency multiplexer including a beam forming network lens comprising a plurality of input terminals and a plurality of output terminals; a transmission line for transmitting a signal to the beam forming lens; and a plurality of couplers arranged in series along the transmission line, each of the plurality of couplers comprising an input terminal, an output terminal, and a coupled output terminal, each of the coupled output terminals of the plurality of couplers being coupled to a respective one of the input terminals of the beam forming network lens.

The beam forming network lens may be a time-delay beam forming network lens.

The beam forming network lens may be a Rotman lens.

The beam forming network lens may be a phase-shift beam forming network lens.

The plurality of couplers may include tuning couplers.

The plurality of couplers may include serial beam spoilers.

The plurality of couplers may include amplitude tapers.

The beam forming network lens may include a plurality of beam forming network lenses.

Spacing between adjacent ones of the plurality of couplers may be the same for each adjacent pair of the plurality of couplers.

Embodiments of the present invention include a passive frequency multiplexer including a Rotman lens including a plurality of steer ports and a plurality of beam ports; a transmission line for transmitting a signal to the Rotman lens; and a plurality of couplers arranged in series along the transmission line, each of the plurality of couplers including an input terminal, an output terminal, and a coupled output terminal, each of the coupled output terminals being coupled to a respective one of the steer ports of the Rotman lens, a spacing between adjacent ones of the plurality of couplers being the same for each adjacent pair of the plurality of couplers.

The plurality of couplers may include tuning couplers.

The plurality of couplers may include serial beam spoilers.

The plurality of couplers may include amplitude tapers.

The Rotman lens may include a plurality of Rotman lenses.

Embodiments of the present invention may include a method of passively converting a time domain signal to a frequency domain signal in real time, the method including receiving the time domain signal via a transmission line; coupling respective portions of the time domain signal to input terminals of a beam forming network lens via a plurality of couplers; reading an output signal at an output terminal of the beam forming network lens; applying a simple rectification to the output signal to acquire a rectified output signal; and converting the rectified output signal from analog to digital using an analog to digital converter to acquire the frequency domain signal.

The beam forming network lens may be a Rotman lens.

The plurality of couplers may include tuning couplers.

The plurality of couplers may include serial beam spoilers.

The plurality of couplers may include amplitude tapers.

The beam forming network lens may include a plurality of beam forming network lenses.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
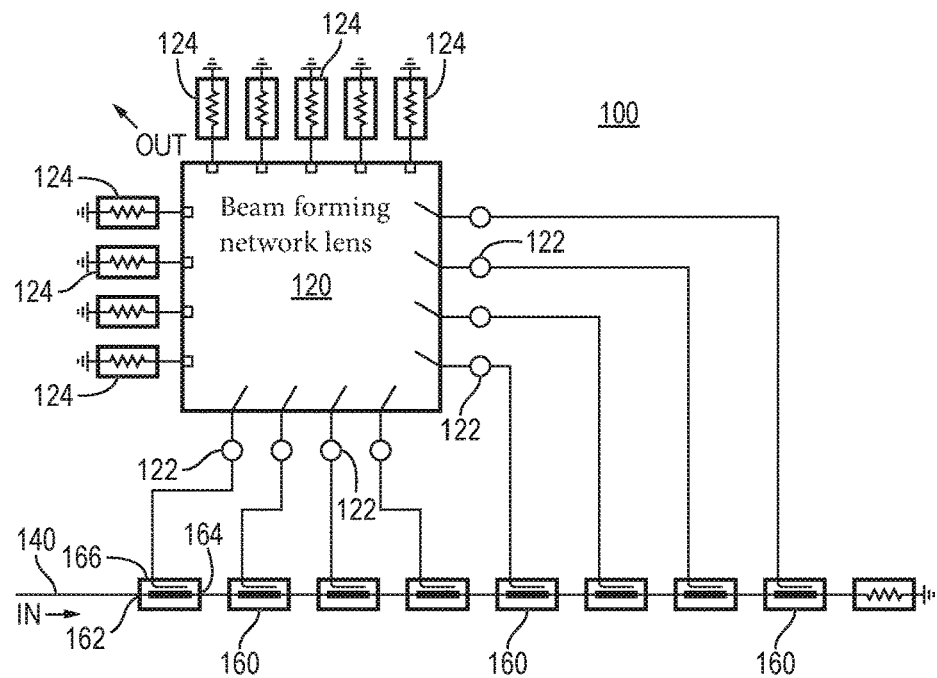
FIG. 1 is a circuit diagram illustrating a passive frequency multiplexer according to an embodiment of the present invention.

The example embodiments are described more fully hereinafter with reference to the accompanying drawings. Like reference numerals refer to like elements or components throughout.

Embodiments of the present invention are capable of converting time domain signals to frequency domain signals in real time using passive RF components. Embodiments of the present invention include a beam forming network lens connected to RF couplers located in series along a transmission line. According to embodiments of the present invention, an input signal is provided on the transmission line, and each RF coupler couples a portion of the input signal to a respective input on the beam forming network lens. Using planar wave construction and deconstruction, the beam forming network lens forms sums and nulls at the beam taps (outputs) of the beam forming network lens to split the input signal into frequency groups that can be directly sampled at the beam taps.

Figure 2:
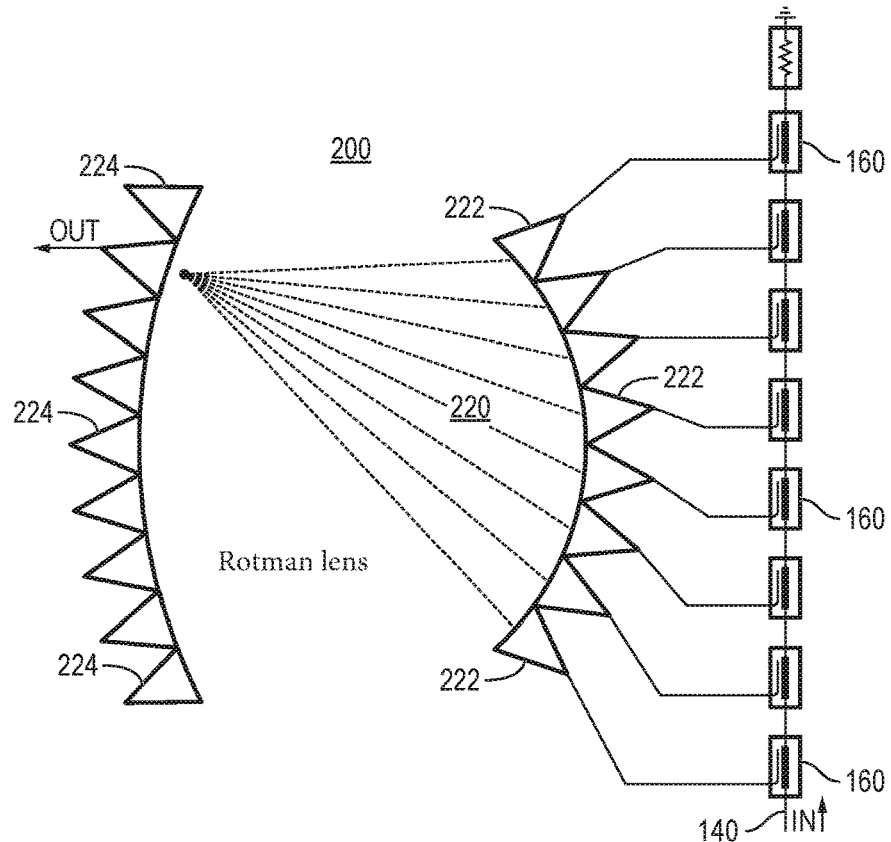
FIG. 2 is a circuit diagram illustrating a passive frequency multiplexer utilizing a Rotman lens according to an embodiment of the present invention.

FIG. 1 is a circuit diagram illustrating a passive frequency multiplexer according to an embodiment of the present invention and FIG. 2 is a circuit diagram illustrating a passive frequency multiplexer using a Rotman lens according to an embodiment of the present invention.

Referring to FIG. 1, a passive multiplexer 100 includes a beam forming network lens 120, a transmission line 140, and a plurality of couplers 160 (e.g., RF couplers 160). The beam forming network lens 120 includes beam forming network lens input terminals 122 and beam forming network lens output terminals 124. The couplers 160 include input terminals 162, output terminals 164, and coupled output terminals 166.

The couplers 160 are connected in series along the transmission line 140. Other than the first coupler 160, each input terminal 162 of the couplers 160 is connected to an output terminal 164 of a previous coupler 160. The coupled output terminals 166 of each coupler 160 is connected to a beam forming network lens input terminal 122 of the beam forming network lens 120.

A length of the transmission line 140 has n couplers 160 placed along it (n is an integer and n=8 in FIGS. 1 and 2). The spacing between neighboring couplers 160 may all be the same, but the present invention is not limited thereto. In some embodiments, the spacing between neighboring couplers 160 is a multiple of a characteristic wavelength Λ of the signal (e.g., Λ, Λ/2, 2Λ, etc.). The characteristic wavelength Λ is a wavelength at the middle of the frequency band of interest.

While the example embodiments of the present inventions use couplers, the present invention is not limited thereto. For example, power dividers (reactive tees, Wilkinson, etc.) may be used.

The n couplers 160 are respectively connected to n beam forming network lens input terminals 122 of the beam forming network lens 120 such that amplitude and phase are normalized and equal. There are m beam forming network lens output terminals 124 of the beam forming network lens 120 that act as m frequency bins (m is an integer and m=9 in FIGS. 1 and 2).

A signal is applied to the transmission line 140 (IN). The signal passes through the couplers 160 and a portion of the signal is coupled to the beam forming network lens input terminals 122 by the couplers 160 via the coupled output terminals 166. An output can be read out at the beam forming network lens output terminals 124 (OUT).

Applying simple rectification to the readout of the m beam forming network lens output terminals 124 and inputting the result to a digitizer (analog to digital converter) will sample amplitude of the frequency domain directly. Planar waves will construct and deconstruct at the beam forming network lens to form sums and nulls at beam forming network lens output terminals 124 such that a frequency at the characteristic wavelength Λ will appear like an m-point sync function with a peak at the center, a lower frequency will show up as an m-point sync function with a peak at the left, and a higher frequency will show up as an m-point sync function with a peak to the right.

Embodiments of the present invention can be implemented as a single device. For example, the plurality of couplers 160 can be integrated into the beam forming network lens 120, such that the integrated device has a single input terminal 122 and multiple output terminals 124 and there would be no need for additional external couplers 160.

Referring to FIG. 2, in some embodiments of the present invention, a passive multiplexer 200 includes a Rotman lens 220. When the beam forming network lens 120 is a Rotman lens 220, the beam forming network lens input terminals 122 may be steer ports 222 (or array ports 222) and the beam forming network lens output terminals 124 may be beam ports 224 (or beam taps 224).

In embodiments of the present invention input ports may be referred to as array ports on a conventional lens, and output ports may be referred to as the beam ports on a conventional lens. Further, according to embodiments of the present invention, output ports may be frequency bins.

Signals entering the Rotman lens via the steer ports 222 travel varying distances to reach the beam ports 224. As represented by the dashed lines, signals travelling the varying distances arrive at one of the beam ports 224 and, by construction and deconstruction, form sums and nulls to create the signal that is read out at the beam port 224.

While FIG. 2 shows the beam forming network lens 120 as a Rotman lens 220, the present invention is not limited thereto. Further, the Rotman lens 220 is an example of a time-delay beam forming network lens but the present invention is not limited thereto and a phase-shift beam forming network lens (e.g., a Butler matrix lens) may be used. For example, the beam forming network lens 120 may be implemented as a Rotman lens 220, a Rotman-Archer lens, a Butler matrix lens, etc.

While the embodiments provided in FIGS. 1 and 2 show eight couplers 160 and show that the beam forming network lens 120 has eight beam forming network lens input terminals 122 and nine beam forming network lens output terminals 124, the present invention is not limited thereto and embodiments of the present invention may include any number of couplers 160 and the beam forming network lens 120 may have any number of beam forming network lens input terminals 122 and beam forming network lens output terminals 124. Further, embodiments may include a different number of couplers 160 and beam forming network lens input terminals 122.

In some embodiments, the number of couplers 160, beam forming network lens input terminals 122, and beam forming network lens output terminals 124, as well as the degree of coupling of phase shift of the couplers 160, can be varied and optimized to tune for different sample sizes and frequency fidelity as desired for the specific application. Further, couplers 160 may be tuning couplers or specialized beam forming couplers.

Further, the beam forming network lens 120 (e.g., the Rotman lens 220) may be physically warped to normalize to frequency.

In other embodiments, serial beam spoils, such as a delta beam, may be built into the n coupler 160 such that all or a portion (e.g., half) of the couplers could have a 180° phase shift built into the couplers 160, such that a delta beam (rather than the sync function sum beam) is produced on the m beam forming network lens output terminals 124. Further, special serial beam spoils and amplitude tapers (e.g., Taylor series tapers) can be implemented on the couplers 160 to sharpen beams and reduce sidelobe content. A grating lobe effect may be used to collect harmonic data.

In yet another embodiment, there may be multiple beam forming network lenses. For example the signal carried on transmission line 140 may be sampled as a sum beam at beam forming network lens output terminals 124a of a first beam forming network lens 120a and sampled as a delta beam at beam forming network lens output terminals 124b of a second beam forming network lens 120b. The sum and delta beams may be combined (e.g., in mono-pulse radar) to get higher detailed frequency resolution (i.e., more sharply defined frequency resolution).

In another embodiment, precision placement of the m beam forming network lens output terminals 124 (e.g., at precise angles) can be used to get an increased amount of frequency information from a decreased number of beam forming network lens output terminals 124.

Embodiments of the present invention allow for instantaneous or near instantaneous conversion of time domain signals to frequency domain signals without the need to perform a Fourier transform and the related processing. Embodiments of the present invention may be directed to radio frequencies (i.e., "RF"), but the present invention is not limited thereto. Sizes of devices according to embodiments of the present invention may vary depending on the frequencies that the device is directed towards.

Figure 3:
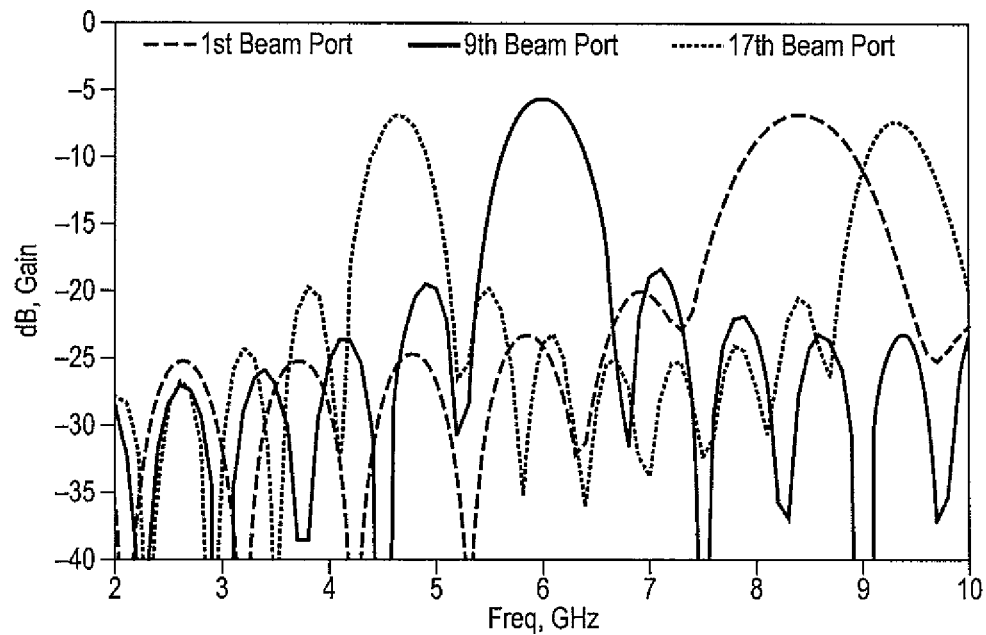
FIG. 3 illustrates frequency domain signals read out from three representative beam ports of a Rotman lens with seventeen beam ports and eight steer ports according to a model of an embodiment of the present invention.
Figure 4:
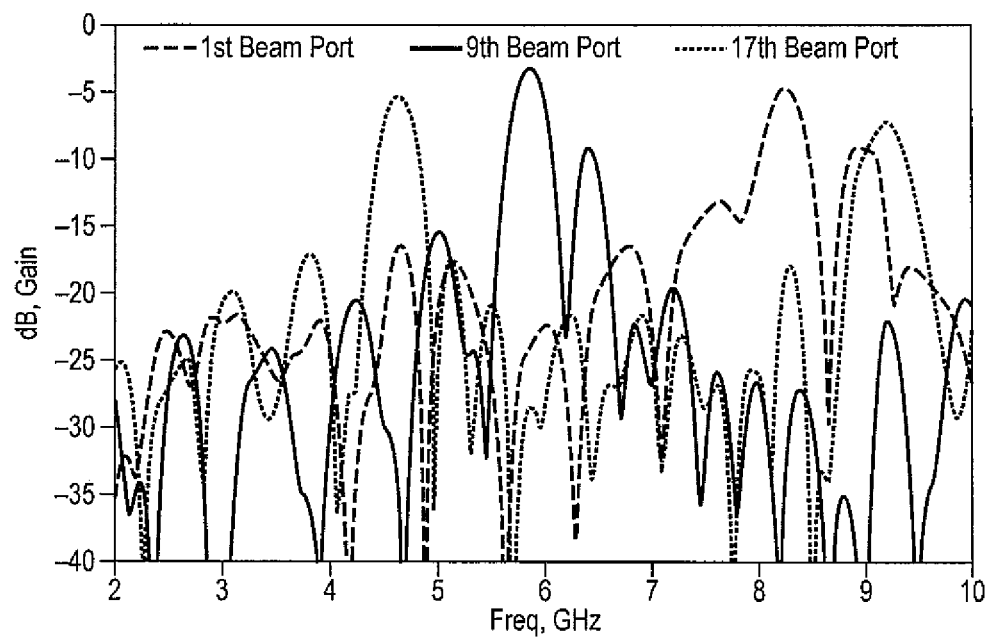
FIG. 4 illustrates frequency domain signals read out from three representative beam ports of a Rotman lens with seventeen beam ports and sixteen steer ports according to a model of an embodiment of the present invention.

FIG. 3 illustrates frequency domain signals read out from three representative beam ports 224 of a Rotman lens with seventeen beam ports 224 and eight steer ports 222 according to a model of an embodiment of the present invention and FIG. 4 illustrates frequency domain signals read out from three representative beam ports 224 of a Rotman lens with seventeen beam ports 224 and sixteen steer ports 222 according to a model of an embodiment of the present invention.

Some embodiments of the present invention are described as models. Example models may include an Advanced Design System (ADS) transient model.

FIG. 3 shows that a simple Rotman lens with eight steer ports 222 with A spacing between the couplers 160 shows frequency specific signal peaks occurring at the various beam ports 224. Specifically, the first, ninth, and seventeenth beam ports 224 are illustrated in FIG. 3. FIG. 4 shows that a simple Rotman lens with sixteen steer ports 222 with A spacing between the couplers 160 shows frequency specific signal peaks occurring at the various beam ports 224. Specifically, the first, ninth, and seventeenth beam ports 224 are illustrated in FIG. 4. In comparing FIG. 3 and FIG. 4, it can be seen that when the number of steer ports 222 increases, the frequency resolution increases, i.e., the beam peaks narrow.

The model shown in FIGS. 3 and 4 was set up with input frequencies swept from 2 GHz to 10 GHz. In the model, the center frequency (6 GHz) shows up on the center beam port 224 (ninth beam port 224). The extreme beam ports 224 (first and seventeenth beam ports 224) define the upper and lower frequencies (8.5 & 4.6 GHz) that can be detected by the modelled Rotman lens 220. The upper and lower frequencies are determined by the maximum scan angle of the Rotman lens 220 (35°, in FIGS. 3 and 4).

FIGS. 3 and 4 show an extra peak on the seventeenth beam port 224 at 9.3 GHz which shows a 2:1 bandwidth limitation of the serial feed structure in the modelled Rotman lens 220.

At higher frequencies, the peaks get broader and farther apart, making it more difficult to resolve the actual frequency. The peaks are narrower and closer together at the lower frequencies, giving better frequency resolution.

Figure 5:
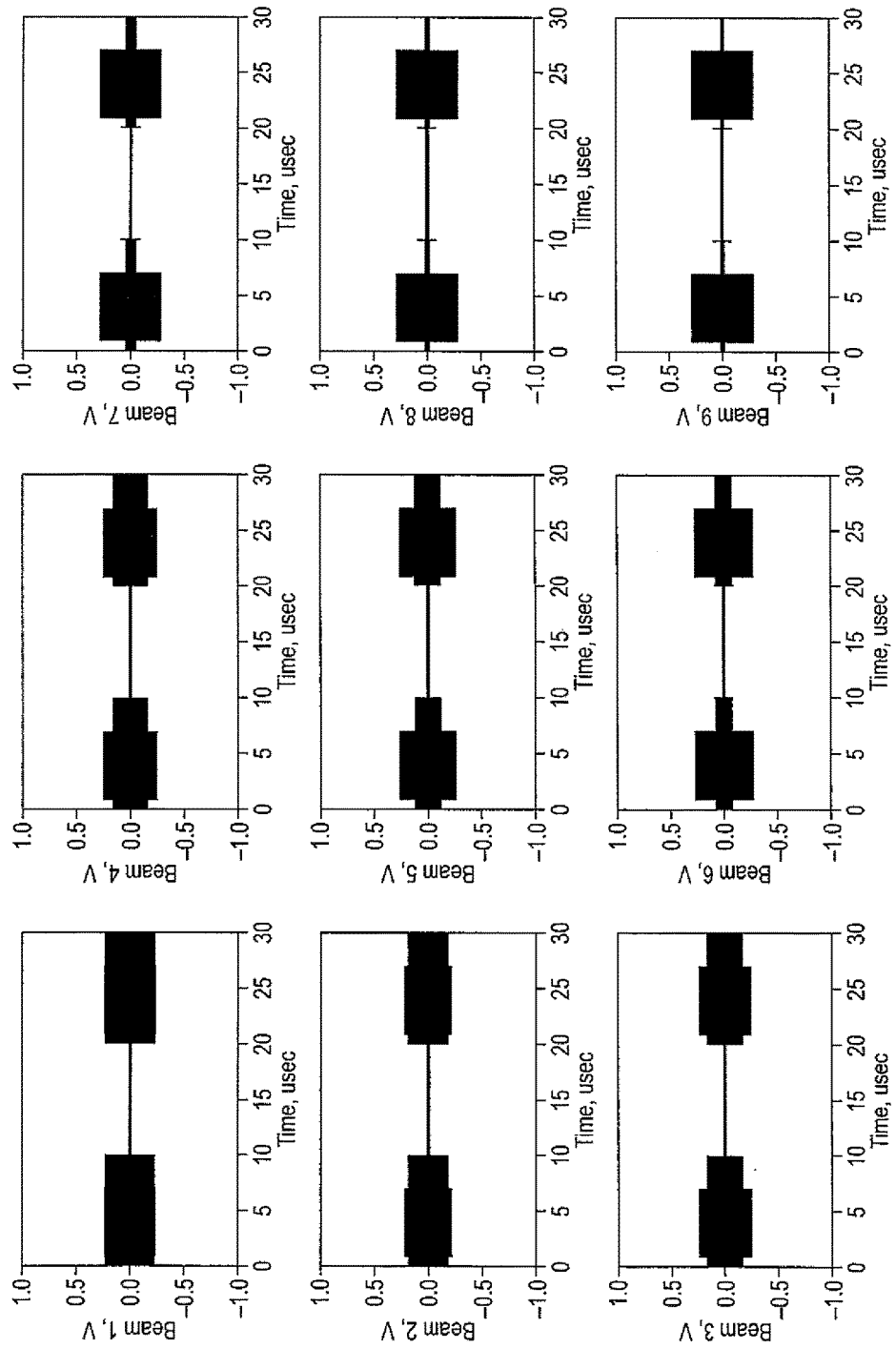
FIG. 5 illustrates output of first to ninth frequency bins according to a model of two concurrent pulses with different frequencies and pulse widths but the same pulse repetition interval (PRI).

FIG. 5 illustrates output of first to ninth frequency bins according to a model of two concurrent pulses with different frequencies and pulse widths but the same pulse repetition interval (PRI). The model was performed with an 8×9 Rotman lens set for 4 GHz. The first pulse has a frequency of 3.7 GHz and has a pulse width of 10 μs and the second pulse has a frequency of 4.25 GHz, a pulse width of 6 μs, and a 1 μs delay.

FIG. 5 illustrates first through ninth frequency bins (e.g., first through ninth beam ports 224). The first bin shows substantially only the 3.7 GHz pulse and the ninth bin shows substantially only the 4.25 GHz pulse, with each of the bins therebetween showing some of each of the pulses. At the center, the fifth bin shows both the 3.7 GHZ and the 4.25 GHz pulses.

Figure 6:
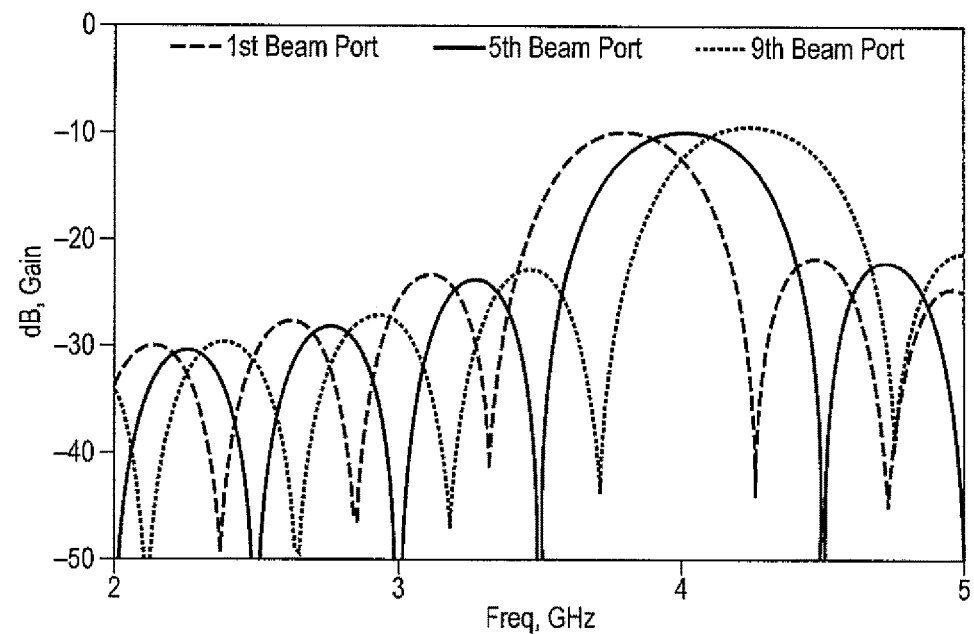
FIG. 6 illustrates a frequency response of first, fifth, and ninth beam ports 224 with a normal S-parameter sweep using the serial feed and the Rotman lens used in the model of FIG. 5.

FIG. 6 illustrates a frequency response of first, fifth, and ninth beam ports 224 with a normal S-parameter sweep using the serial feed and the Rotman lens used in the model of FIG. 5. The S-parameter sweep is a frequency sweep that computes the S-parameter responses for the circuit under test (for example in an ADS model). S-parameters are a measure of reflection and coupling for n-port networks. When the S-parameter sweep is applied to the modelled hardware of FIG. 5, the results are similar to those of FIGS. 3 and 4.

Figure 7:
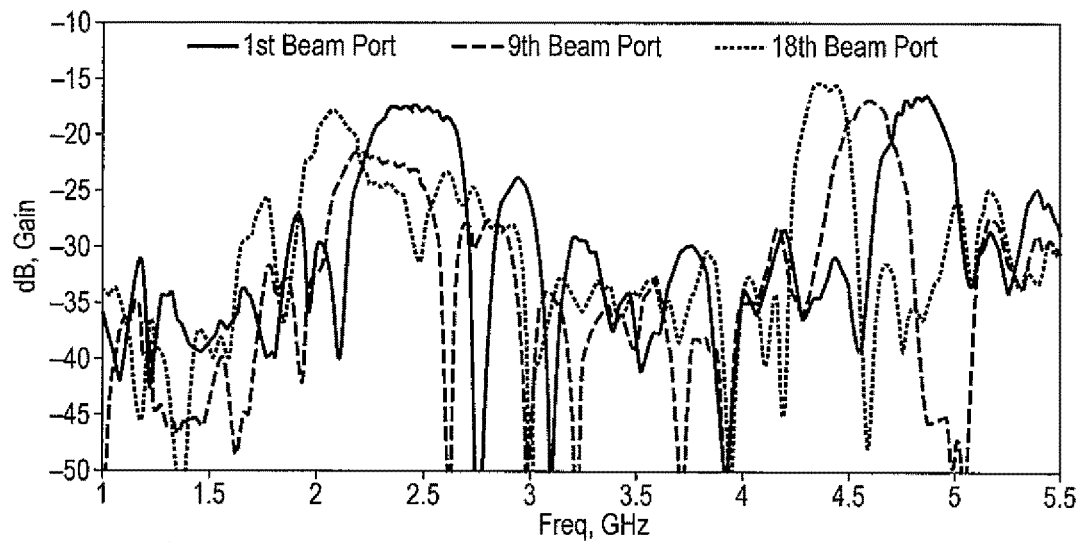
FIG. 7 illustrates experimental frequency domain signals read out from three representative beam ports of a Rotman lens with eighteen beam ports and eighteen steer ports according to an embodiment of the present invention.

FIG. 7 illustrates experimental frequency domain signals read out from three representative beam ports of a Rotman lens with eighteen beam ports and eighteen steer ports according to an embodiment of the present invention.

The Rotman lens used was designed for 2-18 GHz operation. Nine NARDA™ couplers (model 4203) were cascaded as follows (−16 dB, −16 dB, −10 dB, −10 dB, −10 dB, −10 dB, −6 dB, −6 dB, −6 dB) with approximately 3.5" spacing between each coupler. Flex cables of approximately the same length were used to connect the coupled outputs of the couplers to every other one of the steer ports of the Rotman lens. The signals were measured on the Rotman lens's beam ports as frequency was swept into the serial input port.

Peaks can be seen between about 2 GHz and about 2.5 GHz for this specific setup. The specific Rotman lens that was used here was tuned to work better at higher frequencies, and it can be seen in FIG. 7 that the second harmonic frequencies (with peaks between about 4 GHz and about 5 GHz) have more clearly formed peaks.

It will be understood that, although the terms "first," "second," "third," etc., may be used herein to describe various elements or components, these elements or components should not be limited by these terms. These terms are used to distinguish one element or component from another element or component. Thus, a first element or component discussed below could be termed a second element or component without departing from the spirit and scope of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

Further, the use of "may" when describing embodiments of the present invention refers to "one or more embodiments of the present invention."

It will be understood that when an element or component is referred to as being "connected to," "coupled to," "connected with," or "coupled with" another element or component, it can be "directly connected to," "directly coupled to," "directly connected with," or "directly coupled with" the other element or component, or one or more intervening elements or components may be present. Furthermore, "connection," "connected," etc., may also refer to "electrical connection," "electrically connected," etc., depending on the context in which such terms are used as would be understood by those skilled in the art. When an element or component is referred to as being "directly connected to," "directly coupled to," "directly connected with," or "directly coupled with" another element or component, there are no intervening elements or components present.

Also, any numerical range recited herein is intended to include all sub-ranges of the same numerical precision subsumed within the recited range. For example, a range of "1.0 to 10.0" or between "1.0 and 10.0" are intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, and 35 U.S.C. § 132(a).

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents.

What is claimed is:

1. A passive frequency multiplexer for passive radio frequency signal processing, the passive frequency multiplexer comprising:

a beam forming network lens comprising a plurality of input terminals and a plurality of output terminals;

a transmission line for transmitting a time domain signal to the beam forming lens; and a plurality of couplers arranged in series along the transmission line, each of the plurality of couplers comprising an input terminal, an output terminal, and a coupled output terminal, each of the coupled output terminals of the plurality of couplers being coupled to a respective one of the input terminals of the beam forming network lens, wherein each of the output terminals of the beam forming network lens is configured to produce a respective frequency component of the time domain signal, and the couplers of the plurality of couplers are uniformly spaced.

2. The passive frequency multiplexer of claim 1, wherein the beam forming network lens is a time-delay beam forming network lens.

3. The passive frequency multiplexer of claim 2, wherein the beam forming network lens is a Rotman lens.

4. The passive frequency multiplexer of claim 1, wherein the beam forming network lens is a phase-shift beam forming network lens.

5. The passive frequency multiplexer of claim 1, wherein the plurality of couplers comprises tuning couplers.

6. The passive frequency multiplexer of claim 1, wherein the plurality of couplers comprises serial beam spoilers.

7. The passive frequency multiplexer of claim 1, wherein the plurality of couplers comprises amplitude tapers.

8. The passive frequency multiplexer of claim 1, wherein the beam forming network lens comprises a plurality of beam forming network lenses.

9. The passive frequency multiplexer of claim 1, wherein the plurality of couplers are uniformly spaced.

10. A passive frequency multiplexer for passive radio frequency signal processing, the passive frequency multiplexer comprising:

a Rotman lens comprising a plurality of steer ports and a plurality of beam ports;

a transmission line for transmitting a time domain signal to the Rotman lens; and a plurality of couplers arranged in series along the transmission line, each of the plurality of couplers comprising an input terminal, an output terminal, and a coupled output terminal, each of the coupled output terminals being coupled to a respective one of the steer ports of the Rotman lens, wherein each of the output terminals of the Rotman lens is configured to produce a respective frequency component of the time domain signal, and the couplers of the plurality of couplers are uniformly spaced.

11. The passive frequency multiplexer of claim 10, wherein the plurality of couplers comprises tuning couplers.

12. The passive frequency multiplexer of claim 10, wherein the plurality of couplers comprises serial beam spoilers.

13. The passive frequency multiplexer of claim 10, wherein the plurality of couplers comprises amplitude tapers.

14. The passive frequency multiplexer of claim 10, wherein the Rotman lens comprises a plurality of Rotman lenses.

* * * * *